United States Patent [19]

deValpillieres

[11] 4,388,825

[45] Jun. 21, 1983

[54] INTEGRAL MANIFOLD ABSOLUTE PRESSURE AND AMBIENT ABSOLUTE PRESSURE SENSOR AND ASSOCIATED ELECTRONICS

[75] Inventor: Didier J. deValpillieres, Southfield, Mich.

[73] Assignee: The Bendix Corporation, Southfield, Mich.

[21] Appl. No.: 797,726

[22] Filed: May 17, 1977

[51] Int. Cl.[3] .............................................. G01L 23/24

[52] U.S. Cl. ...................................................... 73/115

[58] Field of Search ....... 123/32 EA, 32 EJ, 140 MP, 123/198 DB, 117 A, 102; 73/115

[56] References Cited

U.S. PATENT DOCUMENTS

| | | | |
|---|---|---|---|
| 2,980,090 | 4/1961 | Sutton et al. | 123/32 EJ |
| 3,375,711 | 4/1968 | Ives et al. | 73/115 |
| 3,583,374 | 6/1971 | Scholl et al. | 123/32 EJ |
| 3,608,368 | 4/1971 | Cuff | 73/115 |
| 3,651,791 | 3/1972 | Kobayashi | 123/140 MP |
| 3,675,632 | 7/1972 | Nakajima | 123/117 A |
| 3,722,487 | 3/1973 | Ohama et al. | 123/140 MP |
| 3,736,912 | 6/1973 | Okura et al. | 123/140 MP |
| 3,744,471 | 7/1973 | Braun et al. | 123/198 DB |
| 3,757,796 | 9/1973 | Bove et al. | 123/140 MP |
| 3,864,963 | 2/1975 | Rivere | 73/115 |
| 3,938,329 | 2/1976 | van Basshuysen | 123/117 A |
| 4,060,063 | 11/1977 | Hirasawa | 123/198 DB |

*Primary Examiner*—Sal Cangialosi
*Attorney, Agent, or Firm*—Gaylord P. Haas; Russel C. Wells

[57] ABSTRACT

A combination manifold absolute pressure and ambient absolute pressure sensor utilizing a single absolute pressure sensor and a second sensor which is devised to sense the difference between the manifold pressure and atmospheric pressure. The second sensor is provided with a switch mechanism actuated by a diaphram at a preselected pressure difference between manifold pressure and atmospheric pressure. The actuation of the switch mechanism causes a sample-and-hold circuit to sense the instantaneous manifold absolute pressure at the time of actuation of the switch and electrically add the sensed manifold pressure to the set difference between the manifold pressure and atmospheric pressure to provide a signal indicative of ambient absolute pressure. This signal is utilized to provide altitude compensation in a fuel injection system.

10 Claims, 6 Drawing Figures

INTEGRAL MANIFOLD ABSOLUTE PRESSURE AND AMBIENT ABSOLUTE PRESSURE SENSOR AND ASSOCIATED ELECTRONICS

BACKGROUND AND SUMMARY OF THE INVENTION

This invention relates generally to a combination manifold pressure and ambient pressure sensor and, more particularly, to a manifold absolute pressure and ambient pressure sensor which is utilized in conjunction with a control system for a fuel injection system to provide altitude compensation, fuel control, ignition control or exhaust gas recirculation control.

While the sensor and the system of the present invention will be described in conjunction with the provision of altitude compensation of the fuel control of an electronic fuel injection system, it is to be understood that other uses of the various pressure signals may be provided, as for example fuel trim, ignition or spark advance control, or exhaust gas recirculation control. Provision has been made in the past for altitude compensation of a fuel injection system. Normally, the calibration of the control unit for the control of the fuel being fed into the engine is made at sea level. However, with engine operation taking place in a range at or below sea level to high altitudes, it is necessary to compensate the fuel delivery in response to the operation of the vehicle at altitude. If this compensation is not provided, the engine typically will operate on the cruise portion of the fuel law and the operator will be unable to accelerate the vehicle except by accelerating in the wide open throttle mode of operation.

In prior systems, altitude compensation has been provided by deriving an ambient absolute pressure signal through the use of a barometric pressure sensor to provide the necessary ambient pressure signal for the fuel control unit. As can be appreciated, the system can be costly in that it requires an additional sensor and, through the additional component, increases the possibility of failure of the system.

Other schemes have been provided, as for example as disclosed in the Todd L. Rachel U.S. Pat. No. 3,931,808, issued Jan. 13, 1976, wherein the manifold absolute pressure sensor is utilized for a dual purpose, i.e., to provide a constant manifold absolute pressure signal for use by the electronic control unit in controlling the fuel and, periodically, providing a barometric pressure signal in response to certain engine operation conditions. In the specific implementation described in the above referenced Rachel patent the manifold absolute pressure sensor is actuated during cranking of the engine to provide a barometric pressure signal. This signal is utilized to adjust the electronic control unit in accordance with the barometric pressure sensed during cranking. Subsequently, during wide open throttle operation, the manifold absolute pressure signal is sensed to update the barometric pressure signal due to the fact that the manifold absolute pressure sensor signal output is very nearly barometric pressure at wide open throttle operation. However, with this prior system, the stored information with respect to barometric pressure is updated only when the engine is operated in the wide open throttle mode of operation, which may be infrequently.

With the system of the present invention, the information stored with respect to the ambient absolute pressure is updated on a high frequency basis and particularly when the engine manifold absolute pressure, with respect to ambient pressure, exceeds a preselected amount. The preselected amount is preset into the combination sensor during the manufacturing process.

The basic theory of operation of the sensor of the present invention is best understood when it is appreciated that the absolute ambient pressure may be derived from a pair of signals which are generated by the combination sensor of the present invention. The combination sensor generates a first signal which is indicative of a preset relationship between the ambient pressure and the manifold absolute pressure. When this condition occurs, a switch is operated to enable a sample-and-hold circuit to sense the manifold pressure at the time the switch is actuated. With this information, the sensed manifold pressure may be added to the preset differential pressure sensed between the ambient pressure and the manifold pressure to provide an absolute ambient pressure signal. If this ambient absolute signal is further processed by subtracting the sensed manifold pressure therefrom, an engine vacuum signal may be generated which is referenced to ambient pressure. This latter signal may be utilized to change the basic calibration for ignition or exhaust gas recirculation control on a step basis rather than on a comtinuous basis.

Accordingly, it is one object of the present invention to provide an improved and ambient absolute pressure signal sensor.

It is another object of the present invention to provide an improved manifold vacuum pressure signal sensor.

It is still another object of the present invention to provide an improved combination manifold absolute pressure and ambient absolute pressure sensor.

It is still a further object of the present invention to provide an improved sensor of the type described which is inexpensive to manufacture, easily installed and reliable in operation.

Further objects, features and advantages of the present invention will become more readily apparent upon a review of the following specification and the attached drawings in which.

DETAILED DESCRIPTION OF THE INVENTION

Figure 1:
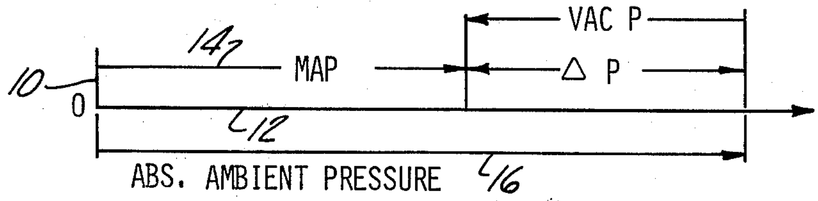
FIG. 1 is a diagram illustrating the various operating pressures of an automobile with respect to absolute pressure and ambient pressure.

Referring now to the drawings, particularly FIG. 1 thereof, there is illustrated a graph of the various pressures which are relevant to the operation of an internal combustion engine, particularly an engine wherein the fuel is controlled by a fuel injection system. Specifically, the graph of FIG. 1 is referenced to absolute zero pressure at the ordinate 10, and the abscissa 12 is a measure of the various pressures to be discussed. As stated above, the typical fuel injection system is provided with a manifold absolute pressure sensor which provides an output signal indicative of the absolute pressure of the manifold, this signal being designated MAP, and is seen to be referenced from the zero absolute pressure at ordinate 10. The absolute ambient pressure, illustrated as line 16, is again referenced to absolute zero at ordinate 10 and is a measure of the barometric pressure referenced to absolute zero. A further signal is illustrated and designated Delta P, the difference between the MAP signal and the absolute ambient pressure signal. Delta P, as will be seen from a further description of the invention, is the pressure differential between MAP and absolute ambient pressure which is utilized to actuate a vacuum switch to provide an enabling signal for the system to sense the manifold absolute pressure at the time the difference between the MAP signal and the absolute ambient pressure signal reaches a pre-selected amount. It will be noted that the Delta P signal is also the vacuum pressure signal which is referenced to atmosphere or barometric pressure. Thus, the manifold vacuum signal may be seen to be the difference between absolute ambient pressure and manifold absolute pressure.

With the systems of the prior art, it is the absolute ambient pressure signal which is generated by the second absolute pressure sensor. It is the elimination of this second absolute pressure signal to provide the barometric pressure which is contemplated within the scope of the present invention. Further, as will be seen from FIG. 1, the MAP signal during wide open throttle will be the same amplitude as the absolute ambient pressure due to the fact that the manifold absolute pressure at wide open throttle, or during cranking, is at barometric pressure. However, this signal only occurs during the specific conditions outlined above, that is, when the engine is not running or when the operator commands wide open throttle operations. Both of these conditions exist very infrequently during the normal operation of an engine.

Figure 2:
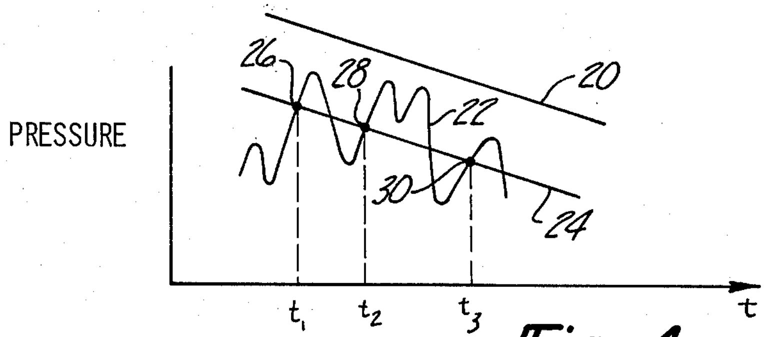
FIG. 2 is a graph illustrating the relationship between manifold absolute pressure, ambient absolute pressure and a pressure which bears a pre-selected relationship to the ambient absolute and specifically is a pre-set pressure below the ambient absolute pressure.
Figure 4:
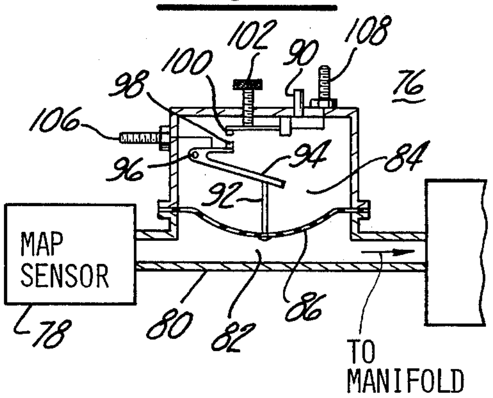
FIG. 4 is a cross-sectional view of another form of the combination sensor of the present invention.
Figure 3:
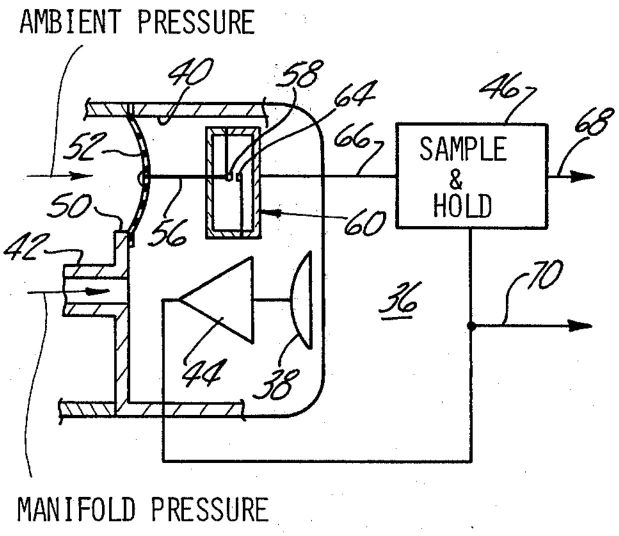
FIG. 3 is a cross-sectional view of one form of the combination sensor of the present invention.

Referring now to FIG. 2, there is illustrated a pressure versus time relationship graph which is utilized to illustrate the operation of the vacuum switch which is described in conjunction with FIGS. 3 and 4. Specifically, the barometric or ambient absolute pressure curve 20 is illustrated as being a generally straight-line curve with a negative slope indicating that the vehicle is climbing to altitude. The manifold absolute pressure signal is illustrated at 22 and is schematically shown to illustrate the variations in manifold absolute pressure as the engine is operated in an acceleration and deceleration mode. The curve 22 is referenced to a set pressure curve 24, the set pressure curve 24 being parallel to and spaced from the barometric pressure curve 20 by a preselected amount which is determined by the set position of the vacuum switch to be described in conjunction with FIGS. 3 and 4. The amount of off-set of curve 24 from curve 20 is selected to fall within the normal cruise operating range of the engine to insure that the manifold absolute pressure signal 22 periodically crosses the set pressure curve 24. Obviously, the greater the frequency of cross-overs, the greater the frequency of up-dating of the system of the present invention.

As is seen from FIG. 2, the manifold-absolute-pressure curve 22 crosses the set-pressure curve 24 from below curve 24 to above curve 24 at a point 26. Similar cross-over points are illustrated at 28 and 30 to provide several time-spaced, cross-over points as the vehicle is climbing to altitude. It is to be understood that the graph of FIG. 2 is utilized purely for illustrative purposes and is not to be considered to be to scale with respect to any of the pressures or time durations shown. Further, it is to be noted that the system is set up to sense the positive slope cross-over of manifold absolute pressure curve 22. However, the system could operate equally well by sensing the negative slope cross-over of manifold absolute pressure curve 22 with respect to set pressure curve 24.

Referring now to FIG. 3, there is illustrated a specific embodiment of a combination sensor unit 36 which is utilized to illustrate the mechanical and electrical features of the present invention. The assembly of FIG. 3 is illustrated as being an aneroid, strain gage type of manifold absolute pressure signal sensor, but other types of sensors or transducers, as for example, oscillating crystal, LVDT, capacitance, and semi-conductor pressure sensors can be utilized. In this connection, an oscillating crystal force transducer which may be utilized in conjunction with sensing manifold absolute pressure, with suitable modifications for converting from force to pressure sensing, may be found in U.S. Pat. No. 3,891,870 issued to James Patrick Corbett. A suitable linear voltage transducer is manufactured by Gulton, Inc., as Model No. GS-2, and a strain gage type sensor is manufactured by National Semiconductor and marketed as Model No. LX 1600. A suitable capacitance sensor is marketed by Setra Corporation as Model No. 204, and suitable semiconductor pressure sensors are marketed by National Semiconductor and Minneapolis Honeywell Corporations.

Referring now to the details of the combination sensor 36, it is seen that an aneroid strain gage sensor 38 is representatively illustrated to sense the manifold absolute pressure being provided to the interior of a cavity 40 by means of a conduit 42. The output of the aneroid 38 is in the form of an analog electrical signal which is amplified through an amplifier circuit 44 and thereafter fed to a sample-and-hold circuit 46. The interior of the hosing 40 is completely enclosed with the exception of an aperture 50 formed therein, the aperture 50 being closed by means of a diaphram member 52.

The diaphram member 52 is utilized to sense the differential pressure between ambient pressure as referenced to absolute and manifold pressure as referenced to absolute. Thus, ambient pressure is fed to one side of diaphram 52, as illustrated by the arrow labeled "ambient pressure." The other side of the diaphram 52 is the member which completely encloses the interior of housing 40 and therefore is subject to the manifold absolute pressure being fed into the interior of housing 40 through conduit 42. Thus, the movement of diaphram 52 inwardly or outwardly with respect of interior of housing 40 is directly related to the difference in pressure between ambient absolute pressure and manifold absolute pressure. Suitable springs may be provided to bias the diaphram, as is common in such combinations.

The difference in pressure between ambient and manifold pressures is derived by sensing the position of diaphram 52 by means of a rod 56, the rod 56 being connected to a sensing contact 58 of a vacuum switch 60. The vacuum switch may be of a type marketed by Marvel-Schebler, Model No. VSX 2497-BO and characterized as a vacuum actuated electrical switch.

The vacuum actuated switch 60, as stated above, consists of a sensing contact 58 and a set point contact 64, the position of the setpoint contact 64 with respect to sensing contact 58 being adjustable. Any suitable adjusting means may be provided such as the adjusting means to be described in FIG. 4, or the arm mounting the contact 64 may be crimped in such a manner as to position the contact 64 with respect to contact 58. The output of the switch 60 is also fed to the sample and hold circuit 46 by means of a conductor 66, the signal on conductor 66 being utilized as to enable the sample and hold circuit.

As stated above, the relative position of the contact 64 is either fixed at manufacture or adjustably fixed at manufacture to provide a preselected actuating differential pressure between sensed ambient absolute pressure and manifold absolute pressure. Referring back to FIG. 2, this relationship is illustrated as curve 24 which is the operating point of the switch 60. Thus, as the manifold pressure achieves a preselected pressure below ambient absolute pressure, as illustrated at line 20, the switch in this case, is closed to provide an enabling signal for the sample-and-hold circuit.

Figure 6:
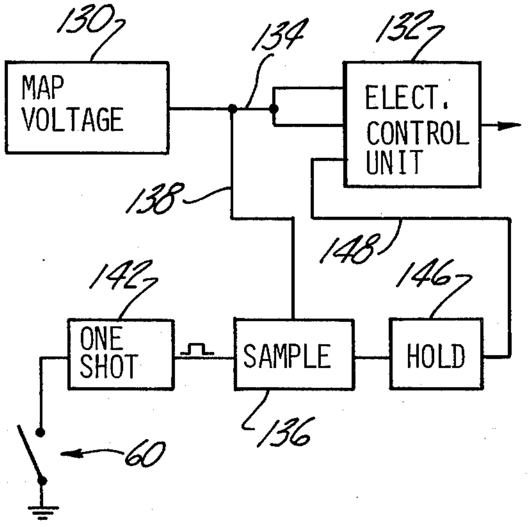
FIG. 6 is a schematic diagram illustrating a contemplated sensor signal processing circuit.

This enabling signal causes the sample-and-hold circuit to provide an output signal on a conductor 68 which is indicative of the manifold pressure at the time the preselected relationship exists between the ambient absolute pressure and the manifold absolute pressure. This pressure differential is the pressure differential which actuates vacuum switch 60 is illustrated in FIG. 1 as Delta P or vacuum pressure as referenced to ambient. This signal, as will be seen from FIG. 6, is fed into an electronic control unit to provide, for example, altitude compensation. As it will be noted from FIG. 6, the instantaneous manifold absolute pressure signal is also fed into the electronic control unit by means of a conductor 70.

Referring now to FIG. 4, there is illustrated the details of a modified, combination manifold absolute and ambient pressure sensor 76 which may be utilized in the system of the present invention. Specifically, a MAP sensor 78 is provided which may be any of the MAP sensors described above. Manifold absolute pressure is introduced to the interior of a cavity formed by a two chambered housing 80, the lower chamber 82 of which is supplied with the manifold pressure. A second chamber 84 is separated from the first chamber 82 by means of a diaphram 86 which is similar to the diaphram illustrated in conjunction with the switch 36. Ambient pressure is introduced to the upper chamber 84 by means of a vent tube 90. Thus, with ambient absolute pressure being supplied in upper chamber 84 and manifold absolute pressure being supplied to lower chamber 82, the diaphram 86 will move upwardly and downwardly in response to the difference in these two pressures. This is similar to the operation as described in conjunction with the description of the operation of the diaphram 52.

The upward and downward movement of the diaphram 86 is sensed by means or a rod 92 and fed to a switch arm 94. The switch arm is pivoted about a pivot point 96 to control the position of a sensing contact 98. A set contact 100 is provided, the relative position of the set contact with respect to the sensing contact 98 being adjustable by means of an adjusting screw 102. Thus, when the position of contact 100 is fixed by means of adjusting screw 102, a preselected pressure differential between ambient absolute pressure and manifold absolute pressure will cause the switch contacts 98 and 100 to close. This will create the signal described in conjunction with FIG. 3 as being present on conductor 66. Suitable terminals 106, 108 are provided to connect external conductors to the switch mechanism.

Figure 5:
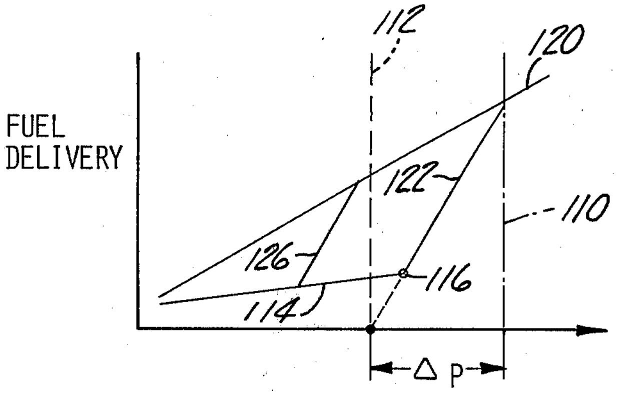
FIG. 5 is a graph illustrating a relationship between fuel delivery and the various operating pressures of an engine.

Referring now to FIG. 5, there is illustrated a graph depicting the relationship between the fuel delivery along the ordinate thereof and the manifold pressure along te abscissa. The ambient pressure is indicated as being along the dashed line 110 under one set of conditions and the ambient pressure as indicated being along the dotted line 112 under another set of conditions. If the line 110 indicates ambient pressure at sea level, and the operator is operating in the cruise mode with fuel delivery indicated at curve 114, it is seen that the transition indicated at knee 116 to wide open throttle fuel delivery indicated by line 120 will proceed along curve 122. Thus, it is seen that is is possible to proceed at cruise and then change to the wide open throttle mode of operation with sufficient fuel being delivered to achieve wide open throttle fuel delivery as indicated by curve 120. However, if ambient pressure actually exists as indicated by dotted line 112, then the fuel delivery will operate only along the cruise curve 114 and the driver will be unable to accelerate except at wide open throttle fuel delivery as indicated at curve 120. With the system of the present invention, the electronic control unit is adapted to shift the knee 116 to the left whereby the transient curve 122 is forced to follow a curve 126 to achieve acceleration of the vehicle.

The circuit of FIG. 6 is utilized to illustrate a block diagram of a system which may be incorporated with the combination sensor of the present invention. The circuit 128 includes a MAP voltage generator circuit 130 which generates an analog voltage in the case of all of the sensors but the oscillating crystal sensor, and a digital voltage in the case of the oscillating crystal sensor described above. This voltage is fed to an electronic control unit 132 by means of a conductor 134 and to a sample circuit 136 by means of a conductor 138. The switch 60 described in conjunction with FIG. 3 is illustrated as a simple single pole, single throw switch which closes to actuate a one-shot multivibrator circuit 142. The one-shot multivibrator circuit enables the sample circuit to pass the MAP signal from MAP voltage circuit 130 to a hold circuit 146. The output of the hold circuit is fed to the electronic control unit 132 by means of a conductor 148 to provide a signal whereby the knee 116 described in conjunction with FIG. 5 may be shifted to the left to produce transient curve 126.

As described above with the exception of the oscillating crystal sensor, the output of the manifold absolute pressure sensor is an analog signal which is sampled and stored in a sample-and-hold circuit. The sample-and-hold circuit is typically designed to store the signal for approximately 50 milliseconds in order to minimize the cost of the hold portion of the circuit. In order to provide extended hold periods, it is contemplated that the system of the present invention will provide an analog signal to a digital microprocessor wherein the analog signal will be converted to a digital signal by means of an analog-to-digital converter and subsequently stored as a digital signal. Accordingly, this digital signal can be stored relatively indefinitely.

In this mode of operation, the digital processor would sample all input values at a given clock rate which may be related to a time rate or an engine related event. Thus, when a pressure sampling cycle is triggered by the switch closure, the sample-and-hold sequence is generated and the switch closing will also raise a flag in the digital processor. This flag will signal the processor to sample the information stored at the output of the holding network at the next analog-to-digital conversion cycle. Accordingly, the analog sample-and-hold circuit, or the digital output of the crystal sensor, need only be held for a short period of time, two or three sampling periods.

While it will be apparent that the embodiments of the invention herein disclosed are well calculated to fulfill the objects of the inventions, it will be appreciated that the invention is susceptible to modification, variation and change without departing from the proper scope or fair meaning of the subjoining claims.

I claim:

1. A combination MAP and AAP sensor for providing output signals indicative of the manifold absolute pressure in an engine and absolute ambient pressure comprising a manifold pressure sensor adapted to sense the absolute manifold pressure of the engine, a differential pressure sensor subject to manifold absolute pressure and ambient pressure including means for sensing the difference between the absolute manifold and ambient pressure, switch means connected to said difference sensing means including a sensing means and a set means, means for setting a preselected relationship between said sensing and set means to establish a difference between absolute manifold and ambient pressure at which said sensing or set means will permit conduction or nonconduction through said switch means, said conduction or nonconduction occurring in response to said ambient pressure achieving said preselected relationship to said manifold pressure, and means for generating an ambient absolute pressure signal in response to said conduction or nonconduction and said manifold absolute pressure.

2. The improvement of claim 1 wherein said differential sensor includes a diaphragm wherein the ambient absolute pressure is impressed on one face of the diaphragm and the manifold absolute pressure is impressed on the other face of the diaphragm.

3. The improvement of claim 2 wherein said differential sensor further includes rod means connected to said switch means for transmitting the motion of said diaphragm to said switch means.

4. The improvement of claim 3 wherein said rod means is connected to said sensing means.

5. A manifold absolute pressure and ambient absolute pressure sensing system for providing a MAP and AAP signal for use in controlling the operation of an internal combustion engine including an electronic control unit, the improvement comprising a manifold pressure sensor adapted to sense the absolute manifold pressure of the engine, and a differential pressure sensor subject to absolute manifold pressure and ambient pressure including means for sensing the difference between the absolute manifold and ambient pressure, switch means connected to said difference sensing means including a sensing contact and a set contact, means for setting a preselected relationship between said contacts, sensing and set means to establish a difference between absolute manifold and ambient pressure at which said sensing or set means will permit conduction or nonconduction through said switch means, said contacts opening or closing in response to said ambient pressure achieving said preselected relationship to said manifold pressure, and signal processing circuit means including a sample-and-hold circuit adapted to receive a signal indicative of the opening or closing of said contacts, means for generating a MAP signal in response to the operation of said manifold absolute pressure sensor, said sample-and-hold circuit being enabled in response to said opening or closing of said switch to provide a signal indicative of said MAP signal, and means for receiving said signal indicative of said opening or closing of said switch means and said MAP signal for generating an AAP signal in response thereto.

6. The improvement of claim 5 wherein said signal processing circuit further includes means for mathematically adding an amount equal to said processing circuit relationship to said MAP signal to achieve said AAP signal.

7. The improvement of claim 6 wherein said signal processing circuit includes a single shot multivibrator connected between said switch means and said sample-and-hold circuit to provide a pulse of preselected duration to said sample-and-hold circuit in response to the opening and closing of said switch.

8. The improvement of claim 7 wherein said differential sensor includes a diaphragm wherein the ambient absolute pressure is impressed on one face of the diaphragm and the manifold absolute pressure is impressed on the other face of the diaphragm.

9. The improvement of claim 8 wherein said differential sensor further includes rod means connected to said switch means for transmitting the motion of said diaphragm to said switch means.

10. The improvement of claim 9 wherein said rod means is connected to said sensing contact.

* * * * *

UNITED STATES PATENT AND TRADEMARK OFFICE

CERTIFICATE OF CORRECTION

PATENT NO. : 4,388,825

DATED : June 21, 1983

INVENTOR(S) : Didier J. DeVulpillieres

It is certified that error appears in the above-identified patent and that said Letters Patent are hereby corrected as shown below:

Inventor's name on patent, delete "deValpillieres", insert therefor --deVulpillieres--.

Column 2, line 24; delete "comtinuous", insert therefor --continuous--.

Column 6, line 8; delete "te", insert therefor --the--.

Column 6, line 17; delete first "is"; insert therefor --it--.

Column 8, line 23; after "said" insert --means--.

Signed and Sealed this

*Fourth* Day of *December 1984*

[SEAL]

*Attest:*

GERALD J. MOSSINGHOFF

*Attesting Officer* *Commissioner of Patents and Trademarks*